United States Patent
Li et al.

(10) Patent No.: US 11,803,695 B1
(45) Date of Patent: Oct. 31, 2023

(54) DYNAMIC SHARABLE WEB CLIPPINGS

(71) Applicant: Plus Docs Inc., Seattle, WA (US)

(72) Inventors: Daniel Li, Seattle, WA (US); Braydon Batungbacal, Seattle, WA (US); Chloe Qi, Seattle, WA (US); Taylor Halliday, Seattle, WA (US)

(73) Assignee: Plus Docs Inc., Seattle, WA (US)

( * ) Notice: Subject to any disclaimer, the term of this patent is extended or adjusted under 35 U.S.C. 154(b) by 0 days.

(21) Appl. No.: 17/656,817

(22) Filed: Mar. 28, 2022

Related U.S. Application Data

(60) Provisional application No. 63/167,567, filed on Mar. 29, 2021.

(51) Int. Cl.
*G06F 40/14* (2020.01)
*G06F 16/957* (2019.01)

(52) U.S. Cl.
CPC .......... *G06F 40/14* (2020.01); *G06F 16/9577* (2019.01)

(58) Field of Classification Search
CPC .............................. G06F 40/14; G06F 16/9577
See application file for complete search history.

(56) References Cited

U.S. PATENT DOCUMENTS

| | | | |
|---|---|---|---|
| 2008/0104520 A1* | 5/2008 | Swenson | G06F 16/957 707/E17.119 |
| 2010/0174774 A1* | 7/2010 | Kern | G06F 16/95 709/203 |
| 2017/0032494 A1* | 2/2017 | Yuan | G06F 40/143 |
| 2017/0337168 A1* | 11/2017 | Kunze | H04L 67/01 |
| 2018/0129657 A1* | 5/2018 | Guest | G06F 9/44 |
| 2020/0410032 A1* | 12/2020 | Huang | G06F 16/953 |
| 2021/0314352 A1* | 10/2021 | Yadav | H04L 63/1416 |

* cited by examiner

*Primary Examiner* — Keith D Bloomquist
(74) *Attorney, Agent, or Firm* — Knobbe, Martens, Olson & Bear, LLP

(57) ABSTRACT

Systems and methods are described for generating dynamic web clippings. A web clipping service can obtain from a client computing device metadata for a dynamic web clipping, which includes an identifier of a web document and state information of a web browser that has rendered the web document on the client computing device, the state information enabling replication of a browsing session of the client computing device. The web clipping service can use the metadata to recreate the browsing session of the client device on the web clipping service, and capture an image of the web document as rendered within he recreated browsing session. The web clipping service can then provide the image of the web document as the dynamic web clipping.

20 Claims, 11 Drawing Sheets

DYNAMIC SHARABLE WEB CLIPPINGS

BACKGROUND

Computing networks like the Internet have become ubiquitous in enabling computing devices to exchange data. The Internet supports a variety of information systems, conforming to a variety of protocols and formats. One particularly well-adopted information system is the World Wide Web, which enables computers to exchange web documents. Typically, the web documents are identified by a uniform resource locator (URL) and transferred via the hypertext transfer protocol (HTTP). Many such documents are hypertext documents formatted in hypertext markup language (HTML). Computers use a "web browser" application to retrieve and render web documents. A variety of web browsers are available, with a high degree of overlap in the particular web documents that can be retrieved and rendered.

While some web documents are wholly static and representable as simple HTML, many others are dynamic. For example, web documents may incorporate client-side scripting, such as JavaScript, that represents executable code. When rendered, this code can interact with another computing device to modify the information displayed in the web document. For example, client-side scripting can be used to monitor user interaction with a web document (e.g., clicks of a mouse, data entry, etc.) and dynamically modify the content of the document based on that interaction. As another example, a computing device serving the web document (a "server") may vary the content of the document based on information obtained from a web browser. Illustratively, a server may validate authentication information provided by the web browser (e.g., in the form of a "cookie") prior to providing a web document, or may modify content of the web document depending on the authentication information. While servers often conform to broad standards for transmission of web documents, the particular code implemented on a server to create dynamic web documents can vary considerably. Moreover, by inclusion of client-side scripting in a web document, which can implement functionality in addition to the basic standard functionality of a web browser, the potential variety of protocols and standards used to support communication between a web document (as implemented by a browser) and a server is virtually limitless.

BRIEF DESCRIPTION OF THE DRAWINGS

FIGS. 1A-1E depict illustrative interfaces for creating and interacting with dynamic web clippings;

DETAILED DESCRIPTION

Figure 1A:
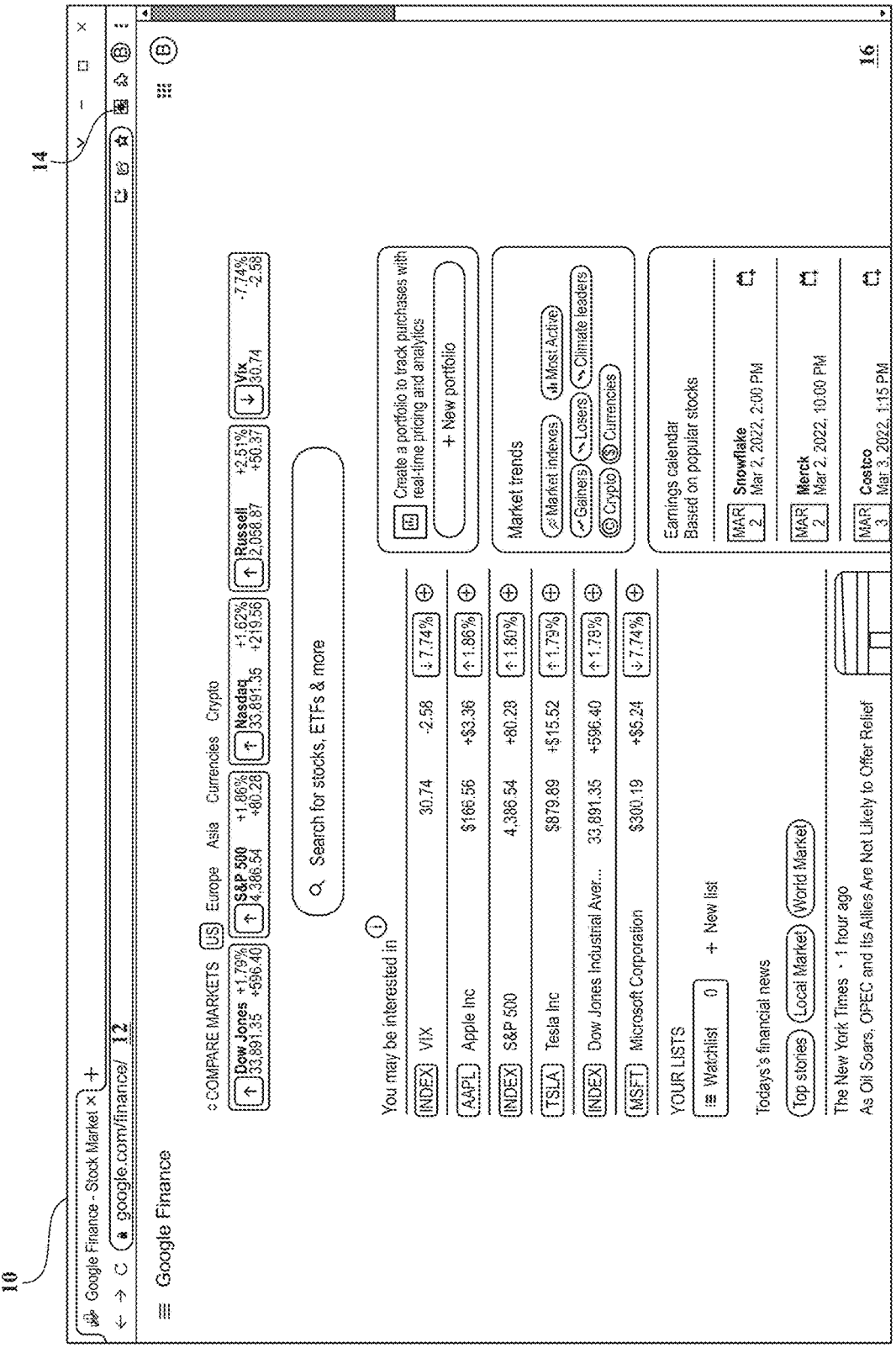

Generally described, aspects of the present disclosure relate to providing for dynamic, shareable web clippings. A "web clipping" as used herein, is a visual representation of at least a portion of a web document. A "web clipping" may also generally be referred to as a snapshot. For example, a web document may be "web page": a web browser rendering of an HTML-formatted document retrieved via the World Wide Web. A web clipping can represent a portion of that web page, such as a particular area of the web page containing content of interest to a user. In accordance with embodiments of the present disclosure, the web clipping may contain dynamic content that is of interest to a user. For example, the web clipping may represent a portion of a web document that contains a graph monitoring a computing system, such as a count of errors on the system. As another example, the web clipping may represent a portion of a web document that contains recent messages obtained on an electronic messaging service. An end user may consider the content of the web clipping to be of importance, and desire to share the content with other users. For example, an end user may wish to show another end user monitoring data within a web clipping. Embodiments of the present disclosure enable secure sharing of dynamic web clippings between users, in a manner that preserves dynamism of the web clipping, enables limiting access to functionality of the web document from which the clipping was created, and supports a wide variety of web documents, even when such documents utilize customized coding (such as client-side scripting) that might otherwise inhibit sharing of dynamic web clippings. The dynamic web clippings discussed herein may also generally be referred to as "live snapshots."

One option for sharing web clippings across computing devices would be for the first user to "screenshot" the relevant portion of the web document by creating an image of the portion, and to send that screenshot to the second user. A downside of this option is that the screenshot, being merely an image, would not inherit the dynamism of the relevant portion. The content of the screenshot would be fixed at the time of taking the image. Assuming the portion contains dynamic content, the second user is likely to see only outdated content.

Another potential option for sharing the information is for the first user to share with the second user specific instructions for accessing the web document. For example, the first user may share with the second user their authentication information (username and password) and directions for accessing the document (e.g., which links to click, etc.). This option has the downside of revealing the first user's authentication information, which is potentially confidential, to the second user. Moreover, even if an option is provided for securely sharing the authentication information without disclosing the actual information to the second user, the second user would likely have complete access to the web document. For example, in the case of sharing a web document providing a current balance in a bank account, even if the second user is not given the first user's username and password, the second user may be able to navigate the web document to take other actions, such as transferring money out of the bank account. Providing such access is often undesirable.

Yet another option for sharing relevant portions of web documents may be to develop customized code that interacts with a server providing the web document and obtains relevant information, while providing for appropriate security. Continuing the example above of sharing banking information, the first user may author custom code to authenticate with a bank's server, obtain the relevant information, and provide that information to a second user in a secure way (while appropriately limiting the second user's other abilities, such as transferring funds). This option is typically infeasible when sharing of multiple different web documents is desired, as the particular code needed to interact with each server can vary considerably.

The present disclosure provides for secure sharing of dynamic web clippings while overcoming the problems noted above. More specifically, embodiments of the present disclosure can enable relevant portions of web documents to be shared between computing devices (and thus between users) while maintaining dynamism of the clipping and enabling limits to functionality of the web document from which the clipping was created. Moreover, web clippings can be created in accordance with the present disclosure without requiring specific re-configuration based on the code, protocols, or interfaces implemented by the relevant web document. Rather, as disclosed herein, a web clipping service can be provided that enables any code embedded within a web document itself to be re-implemented when providing a web clipping, such that the system need not be specifically pre-configured for each type of web document but can instead support any web document otherwise supported by a user's web browser. As disclosed herein, the web clipping service can provide various interfaces, such as an application programming interface (API) enabling client computing devices to create, modify, interact with, and share dynamic web clippings. Accordingly, embodiments of the present disclosure provide for an improved mechanism for sharing content of web documents between computing devices.

More specifically, disclosed herein is a web clipping service that can operate in conjunction with end users computing devices to enable sharing of dynamic web clippings between those computing devices. In one embodiment, a first end user computing device implements a web browser configured to enable dynamic web clippings. Illustratively, the web browser may be a web browser as known in the art (such as GOOGLE's™ CHROME™ browser) that is configured with an extension containing code enabling dynamic web clippings. Alternatively, the web browser may represent software specifically configured to enable dynamic web clippings without requiring such an extension. The web browser can enable a user, when viewing a web document rendered in the browser, to select a relevant portion of the document from which to create a dynamic web clipping. For example, the browser can enable a user to designate an area (e.g., by dragging a selection across the rendered document) of the document to transform into a clipping. The web browser can further collect local state information associated with the web document, which state information can later be used to support re-creating the web document on another computing device. For example, the browser can collect parameters relating to display of the document (such as current viewing dimensions), HTTP cookies related to the document, browser local storage, browser session storage, etc. Information identifying the document, the relevant portion of the document, and the state information can then be transferred to a web clipping service.

On receiving the information from a web browser, the web clipping service can use the information to re-create the web document as rendered on the first end user computing device. For example, the service can load a web browser that is the same or similar to the web browser used to render the document on the first end user computing device. Illustratively, the service may load a browser that uses the same rendering engine as that of the first end user computing device. In some instances, the service's web browser may be the same browser software as implemented on the first end user computing device, but executed in "headless" mode (e.g., without actually outputting information for display). The service may configure its web browser to match a configuration of the browser of the first end user computing device, such as by requesting the same viewing dimensions, the same cookies, local storage, session storage, etc. The service may then load the web document. As discussed herein, the service may further recreate actions of the first end user computing device, such as by recreating user interactions (e.g., mouse clicks, scrolling, text input, touch input, etc.) or by recreating specific browser functionality (e.g., programmatically manipulating the web document, such as by deleting or re-ordering objects to mirror for example "ad blocking" functionality that the first end user computing device may have implemented). Because the service's browser has inherited the state of the first user computing device's browser and otherwise re-implemented functionality of the first user computing device, the server serving the web document may consider the two web browsers (that on the first end user computing device and the service, respectively) to be associated with the same "browsing session." That is, the server may consider both browsers to be legitimate accesses of the web document by the first end user. Accordingly, the web document can be rendered on the service's web browser in the same manner as it would be rendered on the first end user computing device. Assuming that the content of the web document has not changed, the web document rendered in the service's web browser may be identical to that rendered on the first end user computing device's browser. However, if the web document has changed (e.g., due to dynamic content being included in the document), that dynamic content is rendered at the service's web browser. Accordingly, the web clipping service can maintain an up-to-date view of the web document, effectively mirroring an end user's view on their own web browser.

Thereafter, the web clipping service can provide access to the content of the web document to other end users that are authorized by the first end user. For example, assume a first end user wishes to share a portion of the web document with a second end user, and that the first end user has "clipped" the portion as noted above. The first end user may interact with the service to request sharing of the relevant portion (the "web clipping"). The web clipping service, in turn, can generate an image of the relevant portion from the web document as loaded at the web clipping service. The service can then provide a link to that image to the first end user, who may share the link with the second end user as a web clipping. Accordingly, sharing of the relevant portion is enabled between the two end users. Notably, because the web clipping service has direct access to the web document in the same manner as the first end user, the image generated by the web clipping service can represent the dynamic nature of the web document. For example, the service may re-generate the image on request by the first end user or automatically in response to changes detected in the content of the web page. Accordingly, the clippings provided by the web clipping service are distinct from screenshots shared between users, because unlike screenshots, a clipping taken of a web document at a first point in time can nevertheless later be updated to reflect the document at a second point in time, without the end user re-creating the clipping. Moreover, the clippings provided by the web clipping service enable limits to be placed on access provided to a second end user. Illustratively, where the second end user is provided with the clipping as a dynamic image, the second end user may be enabled to view the relevant portion of the web document (including, e.g., changes in the web document over time) but be restricted from interacting with the web document. Still further, the clippings provided by the web clipping service achieve these benefits without requiring specific programming related to an individual web document. That is, the techniques described herein apply to a broad variety of web documents, without alteration based on the particular protocols and interfaces implemented, e.g., by client-side scripting within a web document. Rather, the web browser implemented on the web clipping service may execute such scripting in the same manner as an end user computing device, avoiding the need to pre-configure the service to support a particular web document.

The term "web document," as used herein, generally refers to a document identified by a uniform resource locator (URL) and transferred via the hypertext transfer protocol (HTTP) or a version thereof (e.g., secure HTTP, or "HTTPS"). While the term "web" often refers to the "World Wide Web," one skilled in the art will appreciate that not all web documents are globally accessible. For example, web documents may be associated with private networks, such as corporate intranets, or may be geographically restricted (e.g., due to state-implemented firewalls). Thus, use of the term "web" in "web document" is not intended to imply that such documents are universally available or accessible.

As will be appreciated by one of skill in the art in light of the present disclosure, the embodiments disclosed herein improve the ability of computing systems, such as end user computing devices, to share web content. Moreover, the presently disclosed embodiments address technical problems inherent within computing systems; specifically, the difficulty of sharing dynamic content without direct interaction with a content source (e.g., a web server) and the difficulty of interacting with content sources that utilize a wide variety of protocols and interfaces. These technical problems are addressed by the various technical solutions described herein, including a web clipping service configured to replicate a web browser state of an end user computing device and to save content of a web document as a dynamic web clipping that can be shared with other end user computing devices. Thus, the present disclosure represents an improvement on content sharing systems and computing systems in general.

The foregoing aspects and many of the attendant advantages of this disclosure will become more readily appreciated as the same become better understood by reference to the following description, when taken in conjunction with the accompanying drawings.

With reference to FIGS. 1A-1D, illustrative interfaces for creating and interacting with dynamic web clippings will be described. The interfaces may be displayed, for example, on an end user computing device.

More specifically, FIG. 1A depicts a browser window 10 including a rendered web document 16. In FIG. 1A, the document 16 is a web page, corresponding to the URL 12. While one example document in shown in FIG. 1A, a web browser may render any variety of documents, as is known in the art. In FIG. 1A, the web browser includes an input 14 invoking functionality associated with a web clipping service, as disclosed herein. The input 14 may be integrated directly with the browser application, for example, or may be added to a browser application as an extension. The input 14 illustratively invokes code of the web browser application to carry out functions associated with the web clipping service, as described with respect to FIG. 1A-1D.

Figure 1B:
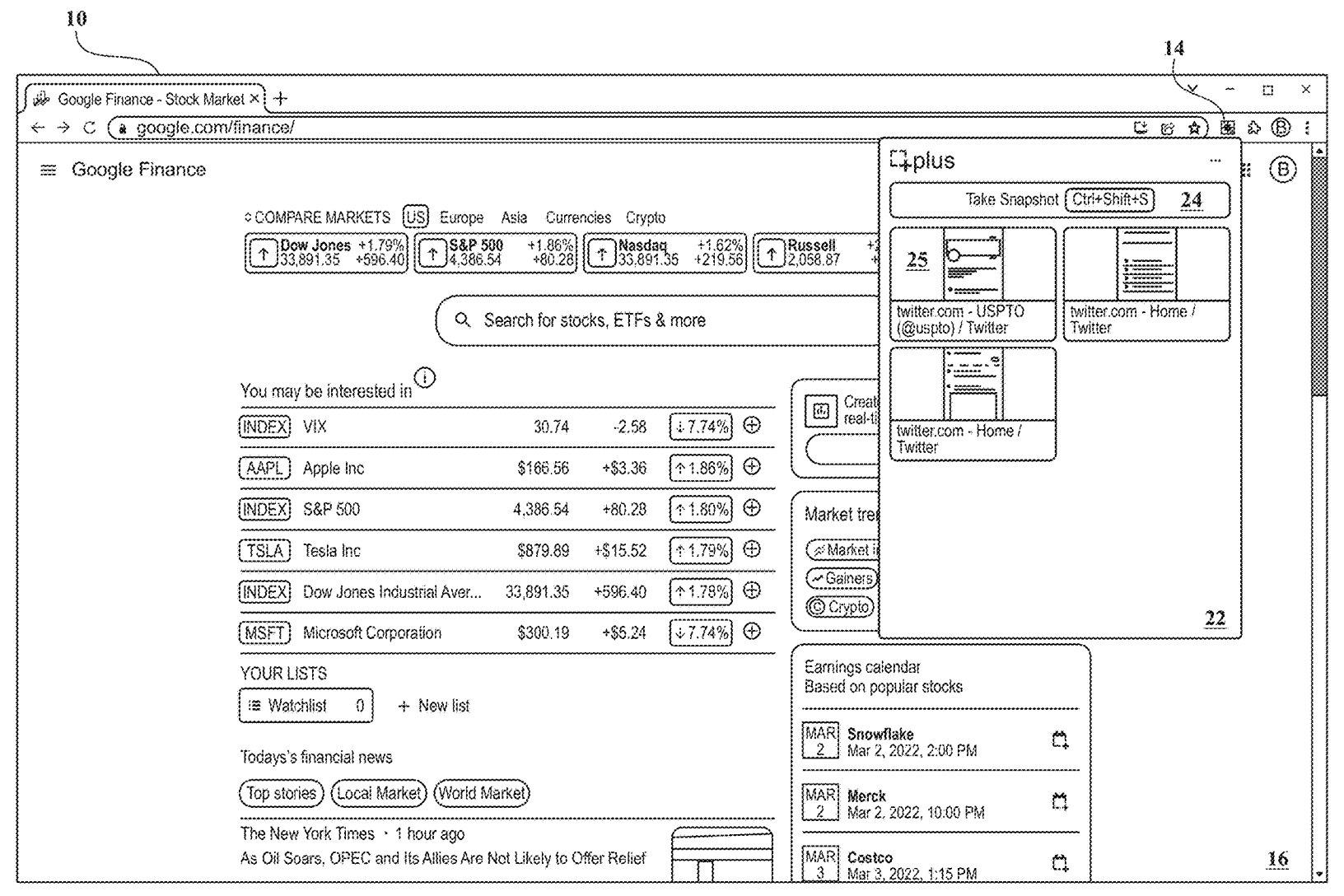

An example interface shown after selection of the input 14 is shown in FIG. 1B. As shown therein, selection of the input 14 illustratively results in panel 22, which provides an additional input 24 to create a new dynamic web clipping. The panel 22 further includes a record of previous web clippings. For example, each prior web clipping may be designated by a panel 25 showing, for example, an image of the web clipping. In one embodiment, the record corresponds to the computing device displaying the interface (e.g., as a record of clippings taken within the same browser 10). In another embodiment, the record corresponds to a user associated with the web clipping service. For example, the browser 10 may enable a user to authenticate with the web clipping service, such that the panel 22 displays all prior clippings associated with the user. While not shown in FIG. 1B, the panel 22 in some instances includes additional functionality, such as functionality enabling a user to rearrange, delete, or modify dynamic web clippings, search dynamic web clippings, share dynamic web clippings, etc., functionality to request a link to a web clipping or to copy a latest image to the clipping, functionality to show a time of creation of the latest image, etc.

Figure 1C:
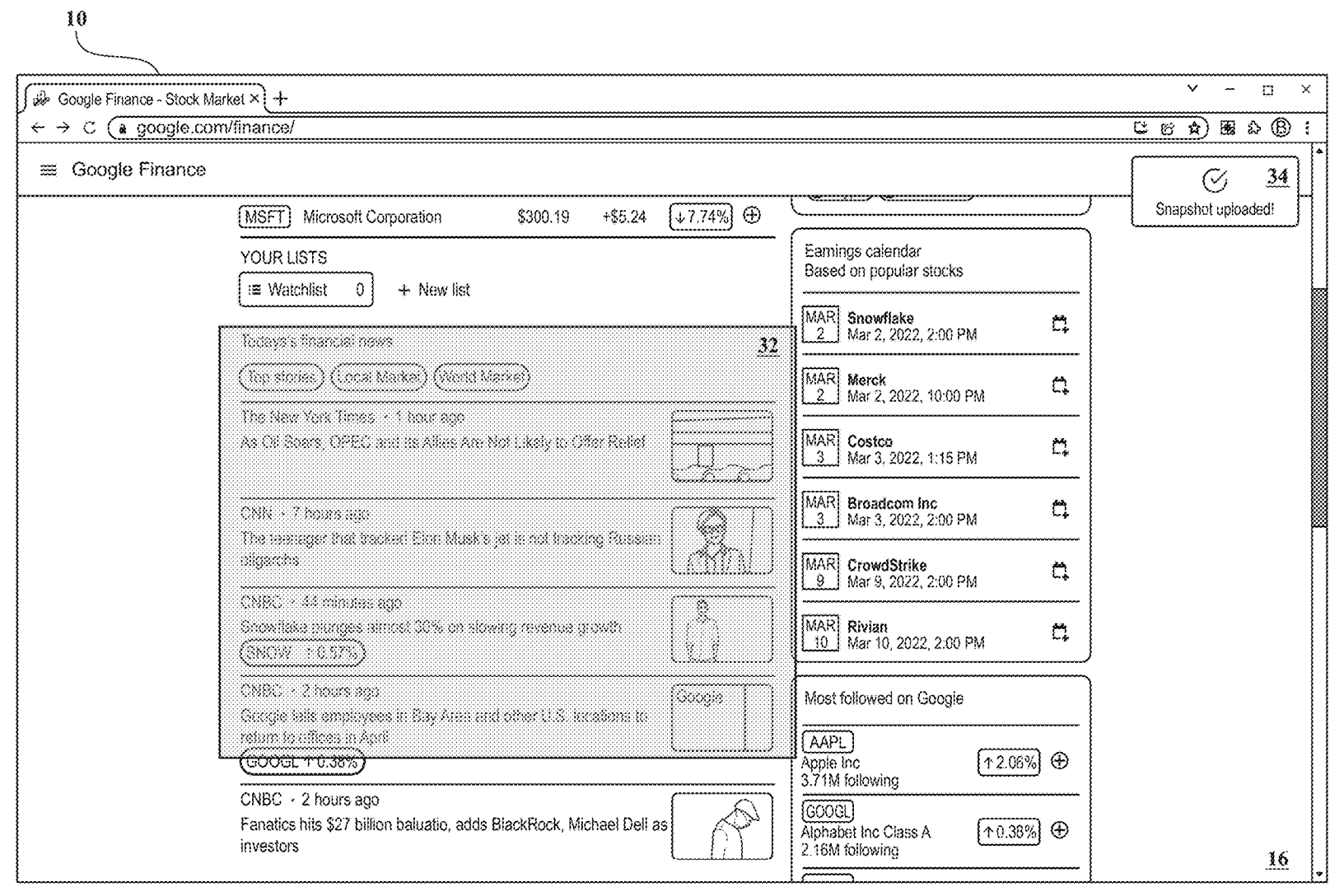

On selection of the input 24, the web browser 10 illustratively enables an end user to designate a relevant portion of the web document 16 to save as a dynamic web clipping. For example, a user may be enabled to "click and drag" over the rendered document 16 to designate a particular area 32 with content of interest, as shown in FIG. 1C. In another embodiment, individual elements of the rendered document 16 may be associated with inputs enabling creation of a clipping corresponding to that element. For example, the document 16 may be associated with an object model (e.g., a Document Object Model, or DOM) denoting specific objects within the rendered document 16. One or more of such objects may be associated with an input that, when selected, requests creation of a dynamic web clipping corresponding to the area of that object within the document 16. On selection of the area, the browser 10 may collect various state information enabling a web clipping service to recreate a browsing session of the user within a remote device, in order to re-render the particular area 32 and to update any dynamic content within the area 32. Collection of state information and re-rendering of a relevant portion of a web document is discussed in more detail below. After collecting and submitting the information to the web clipping service, the browser 10 can notify the end user that a clipping has been successfully created, via notification 34. Illustratively, the panel 22 of FIG. 1B may be updated to include a new dynamic clipping as created via the interactions described with respect to FIG. 1C.

Figure 1D:
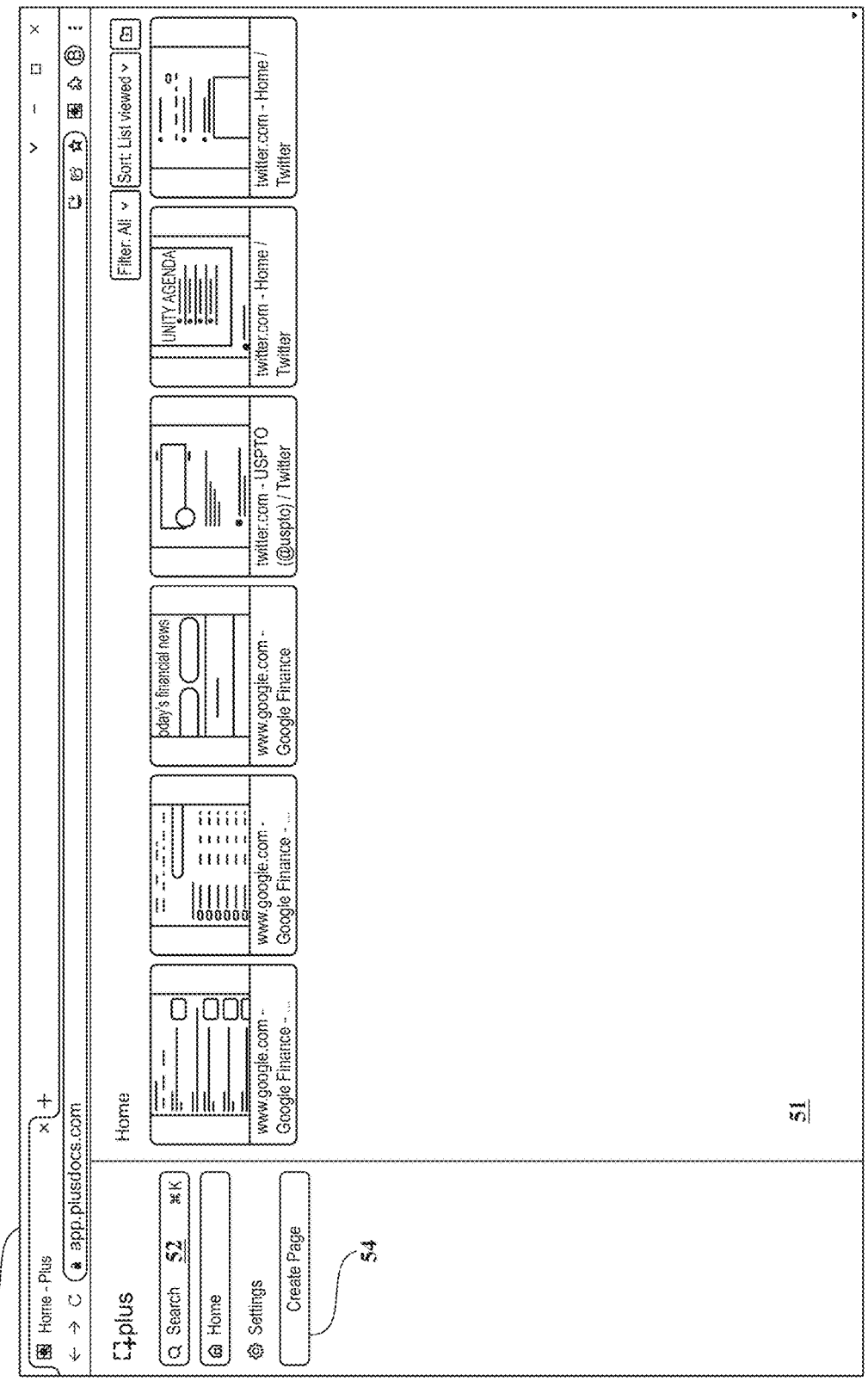

The web browser 10 can additionally or alternatively be configured to provide other interfaces for viewing and interacting with dynamic web clippings. FIG. 1D depicts another example of such an interface, which may be generated, for example, by navigating to a URL associated with a provider of code enabling creation of the dynamic web clippings. As shown in FIG. 1D, the interface includes a panel 51 showing a set of previously-created web clippings (e.g., similar to the panel 22 of FIG. 1B). The interface further enables a user to search prior web clippings via the search input 52. Illustratively, and as described in more detail below, the browser 10 may enable a user to associate a particular clipping with various data fields, such as a title, description, etc. The search input 52 illustratively searches those fields to identify clippings corresponding to input information (representing search criteria). In some embodiments, searching may further be conducted on the basis of content within a dynamic clipping itself. For example, a web clipping service may conduct an analysis of dynamic clipping (such as optical character recognition (OCR) analysis against images corresponding to the clipping or analysis of a version of the web document loaded by the service) to identify field values associated with the clipping at particular points in time. The search input 52 may additionally or alternatively enable searching for such field values. Illustratively, a user may type text into the input 52 to determine whether any images of a dynamic clipping contain a particular search string. The interface of FIG. 1D may in some instances includes additional functionality, such as functionality enabling a user to rearrange, delete, or modify dynamic web clippings, share dynamic web clippings, etc., functionality to request a link to a web clipping or to copy a latest image to the clipping, functionality to show a time of creation of the latest image, etc.

As noted above, a web browser 10 can be configured to enable editing of web clippings. One illustrative interface for such editing is shown in FIG. 1D. The interface may illustratively be reached via interaction with panel 22 of FIG. 1B or panel 51 of FIG. 1D, such as by selection of a web clipping, an "edit" button associated with a clipping, etc. The interface may illustratively include a panel 41 displaying a most recent image of the clipping, an edit panel 42 enabling editing of the clipping, and a share input 43 enabling sharing of the clipping, among other potential elements.

Figure 1E:
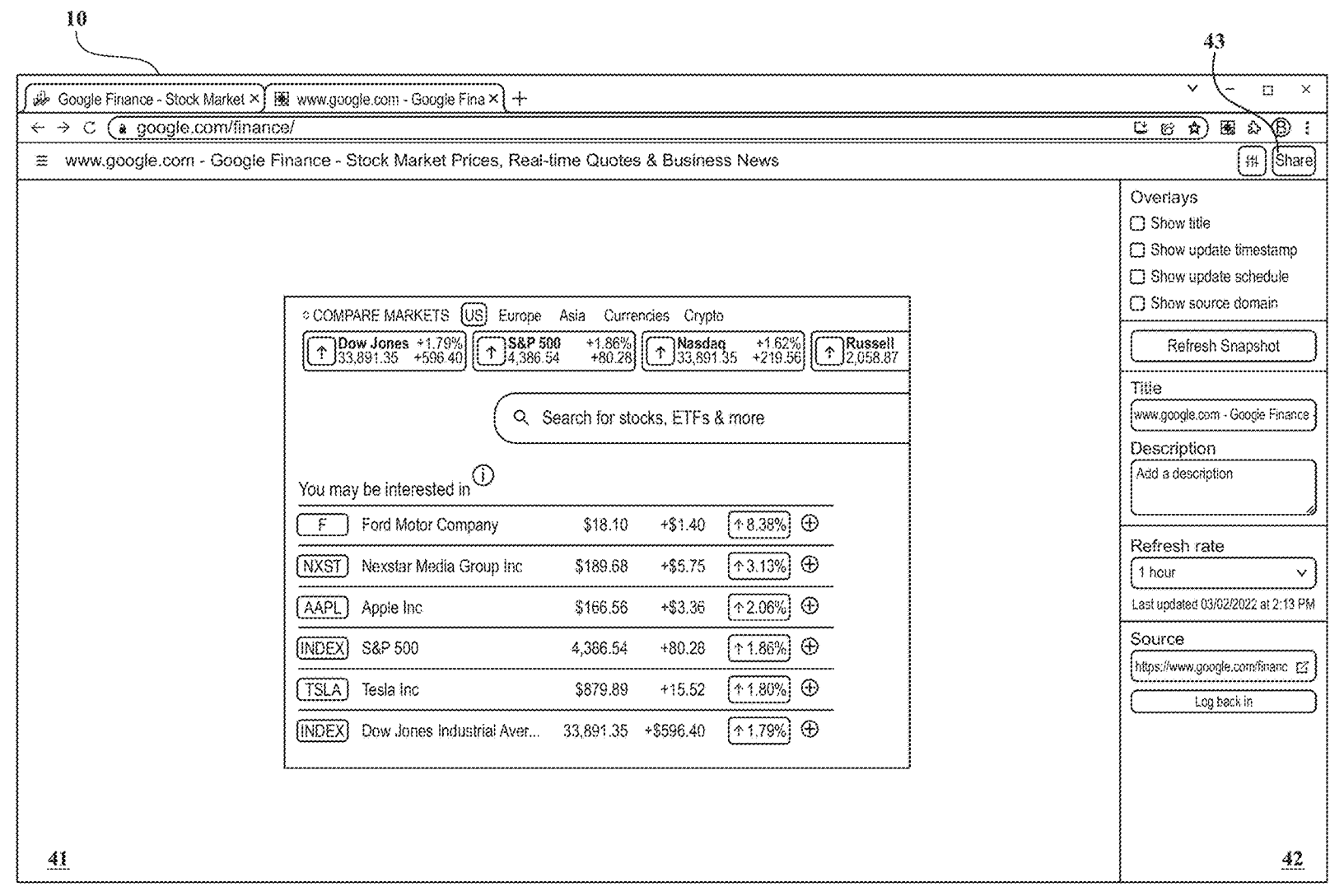

As shown in FIG. 1E, the panel 41 illustratively includes a most recent image of the clipping. In some embodiments, the image may be modified to include overlay data, as shown below, which overlay data may include metadata regarding the image such as when the image was last updated, an identifier of the image, etc. In some embodiments, the panel 41 or other portion of the interface may include a record of images associated with the dynamic web clipping. For example, the panel 41 may show a collection of prior images for the web clipping, with each image is associated with a time at which the image was created from a corresponding web document. By reviewing the images associated with the clipping, the user is enabled to view a state of the web document at each point in time, creating a historical record of that state. Thus, rather than representing a single point-in-time representation of a web document, a dynamic clipping as disclosed herein represents a "living" representation that can be updated as dynamic content of the web document changes.

The edit panel 42 enables a user to modify various aspects of a clipping, such as a name (or title) or description of the clipping. In some embodiments, the edit panel 42 can include controls enabling overlays on the clipping, such that an image of the clipping is modified to insert within the image, or overlay on top of the image, the name of the clipping, description of the clipping, update criteria for the clipping, a source of the clipping, a last update time for the clipping, etc. Selection of such controls may modify the image for the clipping (e.g., as shown in panel 41) to include an overlay of the relevant information. In one embodiment, the edit panel 42 enables a user to specify a refresh rate for a dynamic clipping, indicating a frequency that a new image for the clipping is created. For example, a user may specify a refresh rate of 30 minutes, indicating that a web clipping service should take a new image of the corresponding portion of the web document at that rate, and save the new image as associated with the clipping. Alternatively, the user may designate the clipping as manually refreshed, such that a new image is associated with the clipping only on request by the user. The panel 142 illustratively includes a control enabling such a request for a refresh. The edit panel 42 may further display a source of the web clipping, e.g., a URL from which the web clipping was created. The panel 42 may illustratively enable editing of such a source, and provide an input enabling a user to refresh authentication credentials with a provider of the source. In some embodiments, the interface 42 further enables a user to "tag" a clipping with various terms, creating collections of clippings that share a common term. For example, a clipping may be tagged as "analytics," such that a user is enabled to quickly locate all clippings tagged with that term.

The share input 43 may illustratively be selectable to share a web clipping, such as by creation of a URL at which the web clipping is accessible on a network. The input 43 may further enable specification of permissions associated with a clipping, such as selection of individual users that can access the clipping, designation of the clipping as public, etc. While sharing via URL is one mechanism, other sharing mechanisms are possible. For example, in some instances dynamic web clippings may be incorporated into other applications, including web applications executing within a browser 10. As one illustration, a slide deck application may be modified to enable inclusion of web clippings into slides of a slide deck. Accordingly, the content of such a slide deck may be dynamically updated as the web clipping is updated, rather than being static. A variety of other integrations are possible.

While the interface of FIG. 1E pertains to a single web clipping created from a single source, in some embodiments the interface may additionally or alternatively enable creation of an aggregate web clipping, containing one or more other web clippings and/or other data. For example, the interface of FIG. 1D may include a "create page" input 54 that enables creation of a new, initially blank, aggregate web clipping. Illustratively, selection of the input 54 may result in display of an interface as shown in FIG. 1E, with the panel 41 initially blank. The interface of FIG. 1E may enable an end user to select one or more other, previously created, web clippings to add to the new aggregate web clipping. The interface may further include controls to add elements, such as text or images, to the aggregate web clipping. In this way, the interface may enable creation of 'dashboards' that include multiple dynamic web clippings, which dashboards may each be accessible as a dynamic web clipping. Illustratively, each aggregate web clipping may be refreshable in a manner similar to a non-aggregate dynamic web clipping, with a refresh of the aggregate web clipping including, for example, retrieving a most recent image of each clipping included in the aggregate web clipping. In some embodiments, refreshing an aggregate web clipping may include refreshing each web clipping included in the dashboard.

Figure 2:
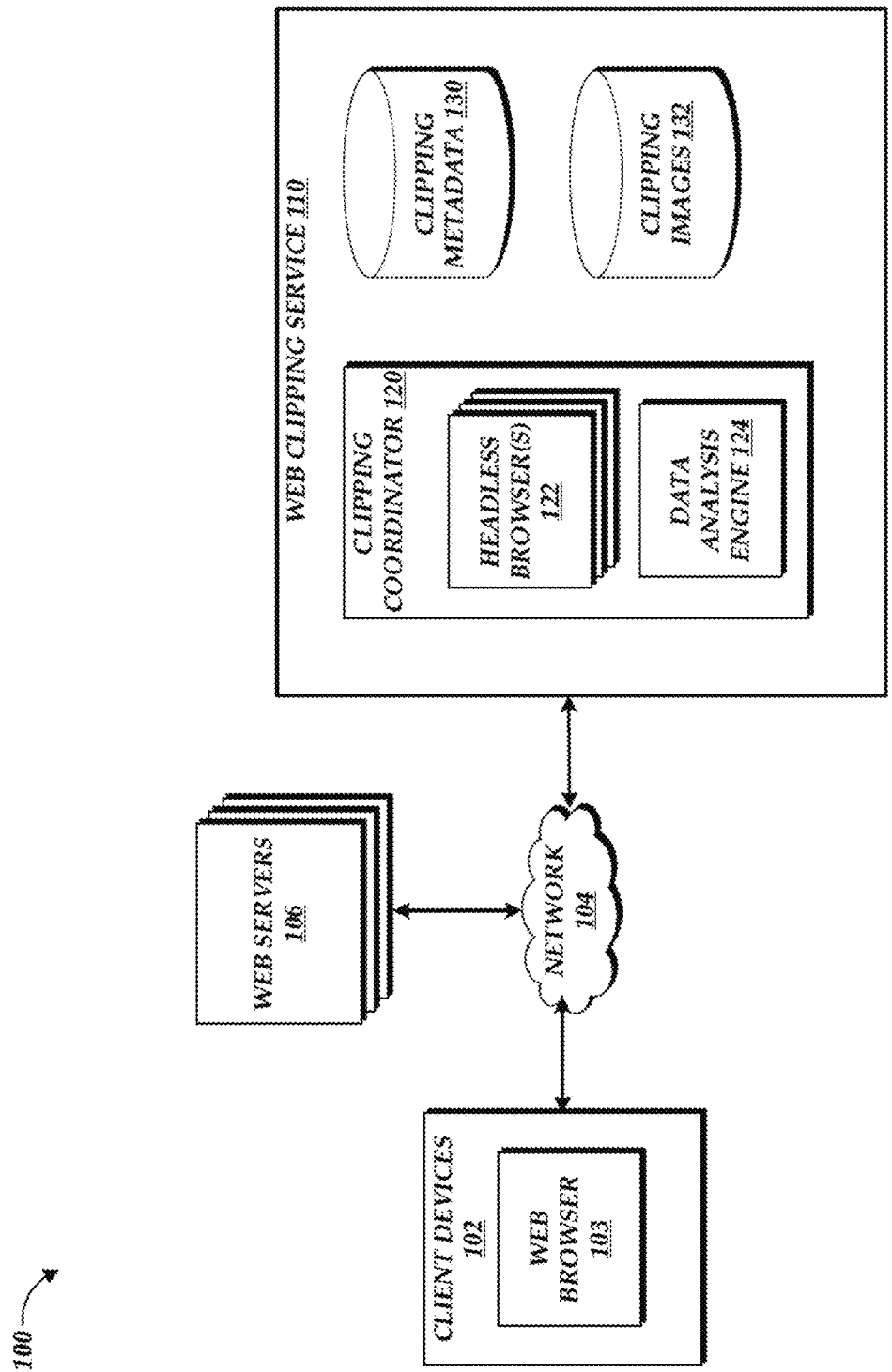
FIG. 2 is a block diagram of an illustrative operating environment in which client devices may interact with a web clipping service via a network in order to create dynamic web clippings from web documents provided by web servers.

FIG. 2 is a block diagram of an illustrative operating environment 100 in which client devices 102 may interact with a web clipping service 110 via a network 104 in order to create dynamic web clippings from web documents provided by web servers 106.

In general, the client devices 102 can be any computing device configured to render web documents, such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. Web servers 106 may similarly be any computing device configured to serve web documents, a wide variety of which are known in the art. Client devices 102 illustratively include a web browser 103, which represents code executable to obtain web documents from the web servers 106 and render such documents for display to an end user. In accordance with embodiments of the present disclosure, the web browser 103 can be configured to enable creation of dynamic web clippings, such as via display of the interfaces of FIGS. 1A-D, described above.

The client devices 102, web servers 106, and web clipping service 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

As shown in FIG. 2, the web clipping service 110 includes a clipping coordinator 120 along with a clipping metadata store 130 and clipping images store 132. The clipping metadata store 130 illustratively includes metadata regarding a clipping, such as a user associated with a clipping, a title, description, and tags, a URL of the clipping, a last update time for the clipping, refresh parameters for the clipping, and references to a set of images associated with the clipping. The images for the clipping are illustratively stored in the clipping images store 132. Note that the information stored in the metadata store 130 and clipping images store 132 may in some cases contain private, confidential, or sensitive information. To ensure no unauthorized or improper use of such information, the information can be stored in an encrypted manner. For example, each user's information may be encrypted with a distinct data key accessible only to the user and authorized representatives (e.g., the clipping coordinator 120). In some cases, the service 110 may implement envelope encryption, whereby the data key is itself encrypted with an additional key (e.g., a "master" key). The encrypted data key may illustratively be stored alongside the information it encrypts, and the master key may be stored at a secure location, such as a key management service (not shown in FIG. 2). The unencrypted data key may only be accessible after authenticating with the key management service, such that unauthorized parties are unable to access the data key. While envelope encryption is one mechanism of secure encryption, others are known and may be used to secure the information of the service 110. In addition to encrypting data at rest, the service 110 may use encryption to secure data during transmission, such as by communicating with client devices 102 and internally using secure sockets layer (SSL) or transport layer security (TLS) communications. Thus, each aspect of the service 110 can be secured in order to ensure privacy and confidentiality of end user's data.

In FIG. 2, management of the clippings is conducted by the clipping coordinator 120. Illustratively, the coordinator 120 can provide an interface, such as an application programming interface (API) through which client devices (e.g., via interaction with a web browser 103) can submit data to create a new clipping, request a refresh of an existing clipping, or request to share a clipping with another user. In this manner, the coordinator 120 may act as an agent of end users in accessing web documents and creating clippings of those documents. Effectively, the coordinator 120 may assist end users in saving images of the documents, such that the images are up-to-date with most recent content of the documents. That is, rather than an end user being required to constantly monitor a web document for new content and save images of that content at appropriate times, a user may instead employ the service 110 to automatically manage images of new content over time in the form of a dynamic web clipping.

To enable associating new images with a clipping, the clipping coordinator 120 includes a set of headless browsers 122. Each browser 122 can represent code executable to obtain and render a web document and generate an image (a "screenshot") representing a portion of that document corresponding to a clipping. Each browser 122 is illustratively configured to replicate state information from a web browser 103 on a client device, such that the web document when rendered on the headless browser 122 matches that which would be viewed on the web browser 103 using the same state information. For example, the headless browser 122 may replicate viewing dimensions, cookies, browser local storage, and browser session storage of the web browser 103. The headless browser 122 may further recreate functionality of the web browser 103, such as by repeating user interactions to the browser 103 or re-implementing functionality of the browser 103 (e.g., programmatic plug-ins) that may modify how the web document is rendered on the web browser 103. When a refresh is requested for a dynamic clipping, the browser 122 may use the state information to render the web document, generate an image of a relevant portion of the web document, and associate the image with the web clipping. In this manner, the web clipping is made dynamic, as the content of the clipping can change over time without the end user (via the client device 102) explicitly rendering and screenshotting the web document.

In addition to the headless browsers 122, the clipping coordinator 120 includes a data analysis engine 124 representing code executable to analyze data of dynamic web clippings and provide various functionalities associated with such clippings. In one embodiment, the data analysis engine 124 analyzes images associated with clippings to determine whether those images have changed relative to a past image, and notifies an end user when a change of sufficient magnitude is detected. For example, an end user may wish to know when an update is posted to a web document, and may therefore create a dynamic web clipping of the web document. Over multiple points in time, the service 110 may create an image of the web document (using state information of the end user's browser). For each image, the data analysis engine 124 may compare the image to an immediately prior image of the document, to determine whether a change in images has occurred, indicating that the web document has been updated. If so, the coordinator 120 may notify the end user of the change. In some instances, change notifications may only be transmitted if a threshold level of change is detected (e.g., a change in a least n % of the content of an image), if specific content is detected (e.g., based on image analysis, such as applying optical character recognition to detect the presence of specific text, such as user-defined keywords, in the image), etc.

In some instances, the data analysis engine 124 may perform additional or alternative analysis. For example, in some embodiments the headless browser 122 may store, in addition or as an alternative to images, other information regarding a web document at a point in time, such as the HTML of the document, a document object model (DOM) tree of the document, or the like. In addition or as an alternative to analyzing images, the engine 124 may analyze this other content to detect changes in a web document. For example, the engine 124 may conduct a comparison of two records of HTML or DOM trees, each representing the document at a different point in time, to detect changes to the document. In some cases, the particular portion that has changed (e.g., portion of an image, HTML, or DOM) may be recorded and viewable in conjunction with a clipping, or an end user may be notified if the specific change meets notification criteria (e.g., a threshold size of change, specific content changing, etc.).

In some instances, the data analysis engine 124 may be configured to determine when a clipping is in a state that requires additional action by an end user. For example, a user may create a clipping of a web document that requires authentication. In some cases, the web document may log out the user after a threshold period of time, such that the web document or desired content of the document is no longer shown. For example, a user may attempt to clip a web page representing an email application, and the user's browser 103 may save state information enabling display of that email application. However, a server 106 providing that application may later log out the user, such that the email application is not shown and instead a user accessing the web document is redirected to a login page. In such a case, the coordinator 120, when attempting to refresh the clipping, may instead capture an image of the login page. Because the login page may be standard across many users, the data analysis engine 124 may be configured to detect that the clipping contains an image corresponding to the login page (or that HTML/a DOM tree obtained for the clipping corresponds to the login page). In response to such detection, the coordinator 120 may notify the end user that the clipping should be refreshed, which may include the end user directing their web browser 103 to the web document, logging into the email application, and providing new state information to the coordinator 120 such that dynamic clipping can be updated to continue accessing the web document. In some cases, the data analysis engine 124 may be used to learn conditions under which a clipping enters an undesirable state (e.g., the web document is inaccessible to the service 110 due to improper or insufficient browser state information). For example, the engine 124 may detect that a particular domain (e.g., a "web site") or server 106 is configured to log out users after a threshold amount of time, such as by detecting that dynamic clippings with refresh periods over the threshold amount of time result in a clipping in an undesirable state, while periods under the threshold do not result in the undesirable state. Based on this analysis, the coordinator 120 may suggest refresh times to an end user. For example, an end user attempting to set a refresh time for a clipping about the threshold may be notified that this configuration is likely to lead to the clipping entering an undesirable state.

In one embodiment, the clipping coordinator 120 is implemented as a physical computing device, and each of the clipping metadata store 130 and the clipping images store 132 are implemented as a substantially persistent data store, a variety of types of which are known in the art (e.g., hard disk drives (HDDs), solid state drives (SSDs), network attached storage (NASs), etc.). In another embodiment, any of the coordinator 120, clipping metadata store 130, and images store 132 are implemented as virtual devices on an underlying physical device. For example, the coordinator 120 may operate as a virtual machine on a hosted computing system, sometimes referred to as a "cloud" computing system, the clipping metadata store 130 may correspond to a relational database hosted on a database system, and the clipping images store 132 may correspond to logical object storage on an object storage system. While shown as a single element of FIG. 2, each of the coordinator 120, clipping metadata store 130, and images store 132 may be implemented as multiple devices. For example, a first computing device may implement a portion of functionality of the coordinator 120, such as by providing an API, a second computing device may host headless browsers 122, and a third computing device may host the data analysis engine 124. In some instances, the coordinator 120 or any components thereof may be dynamically implemented, such as in response to a request to interact with the coordinator 120 or those components. For example, the coordinator 120 or any components thereof may be implemented as functions on a serverless code execution system, such that a host computing device is configured to implement the coordinator 120 or a component thereof on request to interact with the coordinator 120 or component. Moreover, while shown in FIG. 2 as distinct from the client devices 102, in some embodiments the web clipping service 110 may be implemented on client devices 102. For example, a client device 102 may be provisioned with code to implement the elements of the web clipping service 110 on the client device 102, such as in a software container executing on the client device 102. Client-local implementation of a web clipping service 110 may, for example, increase security of dynamic web clippings and information associated with such clippings (e.g., authentication information for web documents from which clippings are taken). Thus, the configuration of the service 110 in FIG. 2 is intended to be an illustrative logical configuration of the service.

Figure 3A:
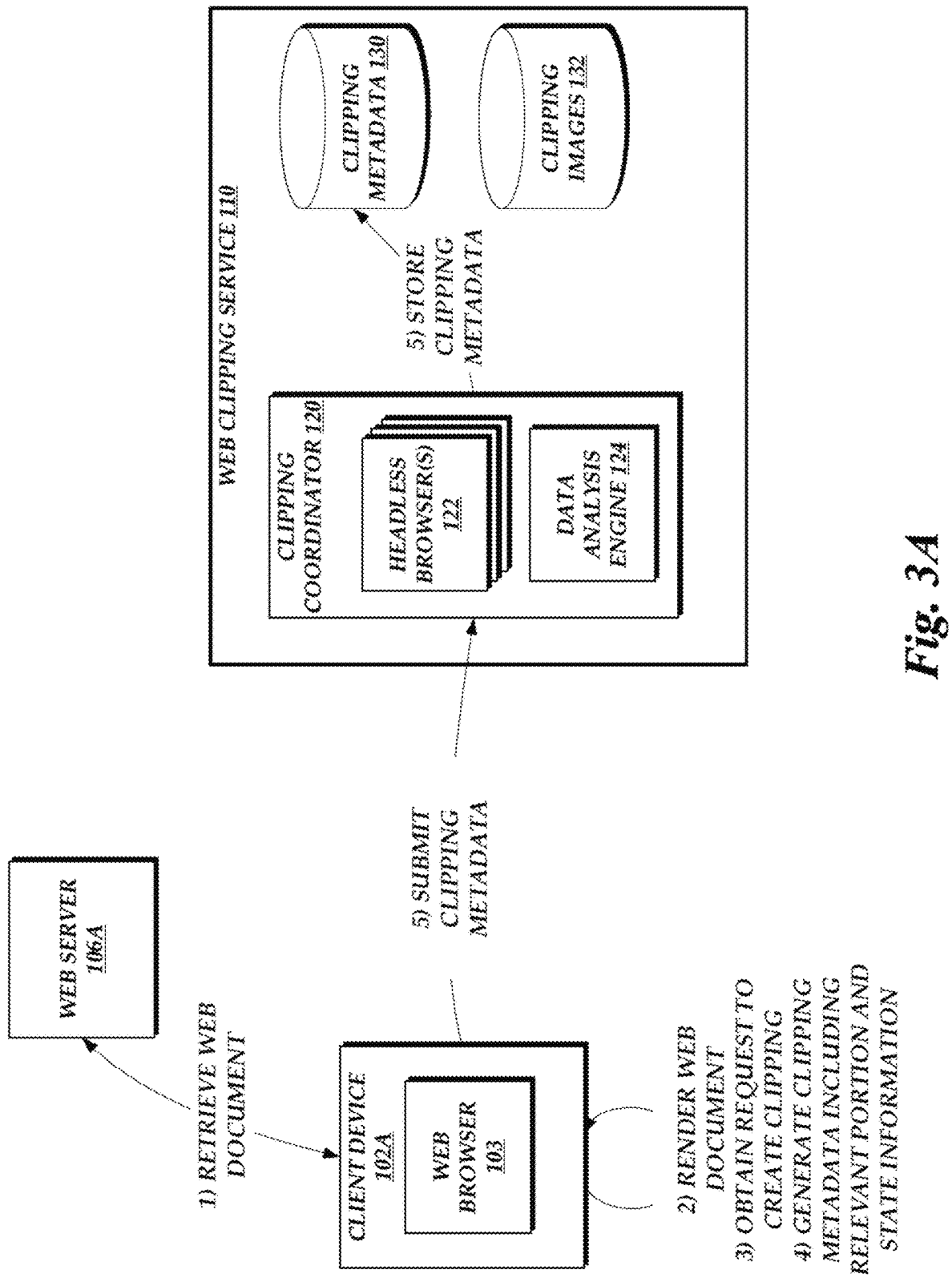
FIGS. 3A-3C depict illustrative interactions for creating, refreshing, and sharing a dynamic web clipping in accordance with embodiments of the present disclosure.
Figure 3B:
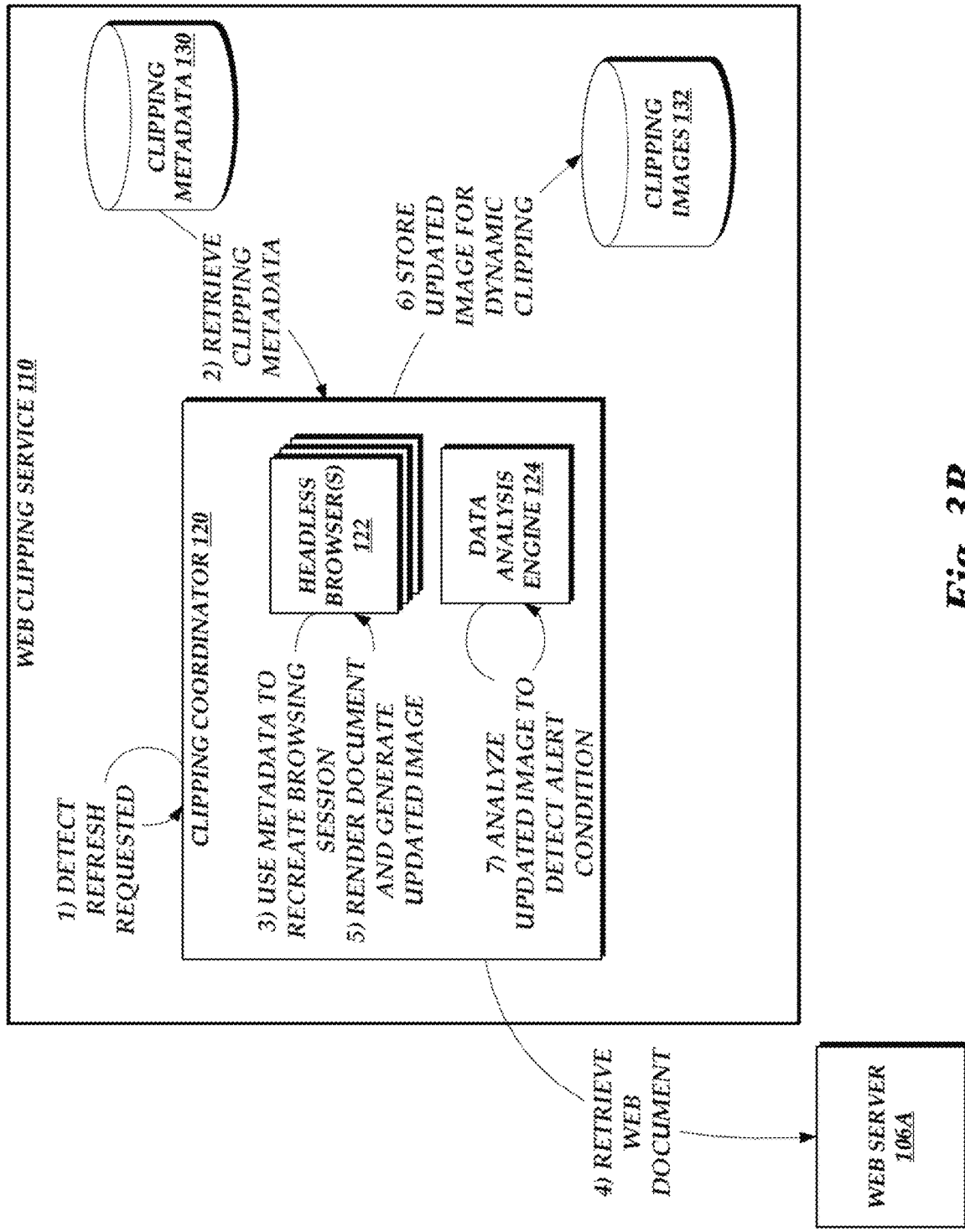
Figure 3C:
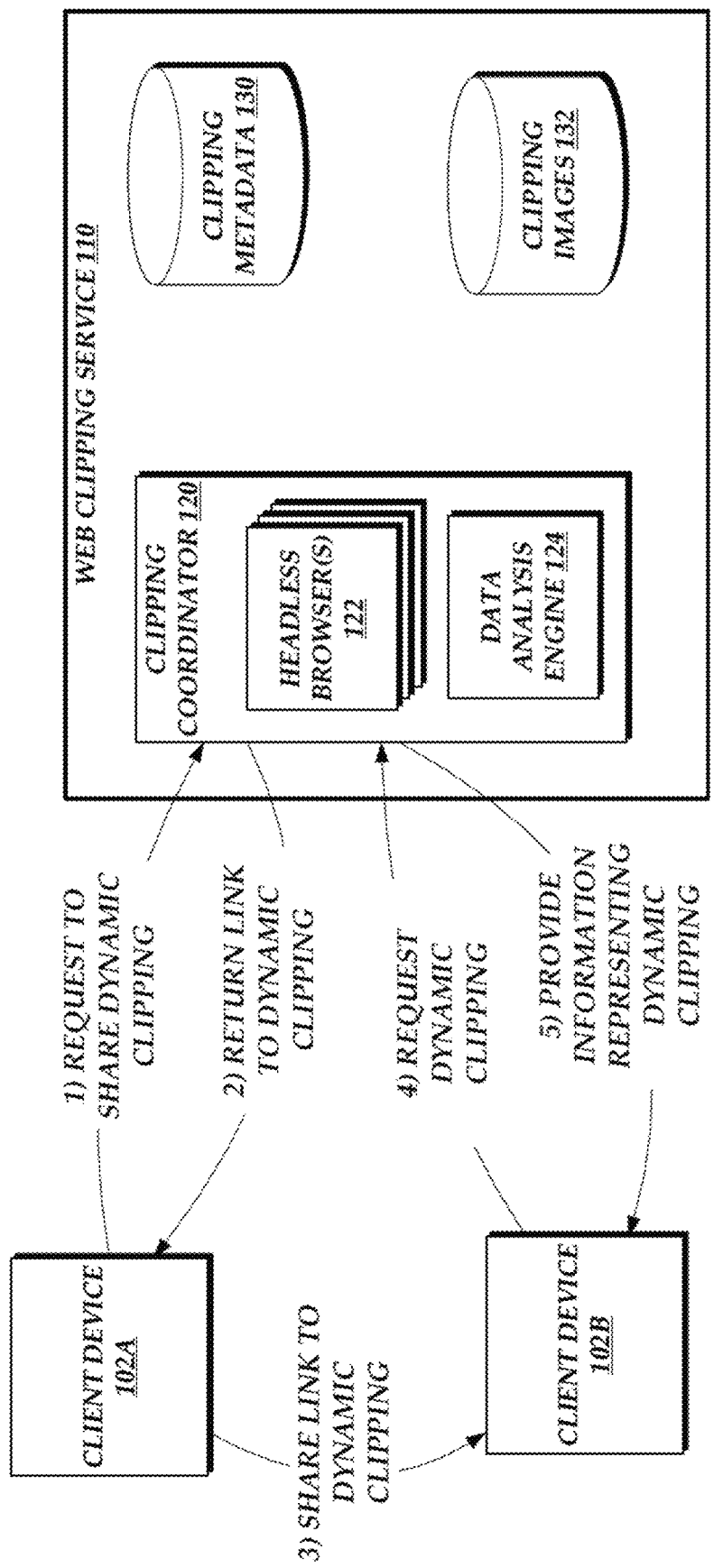

With reference to FIGS. 3A-C, illustrative interactions are depicted for creating, refreshing, and sharing a dynamic web clipping in accordance with embodiments of the present disclosure. Specifically, FIG. 3A depicts illustrative interactions for creating a dynamic web clipping, FIG. 3B depicts illustrative interactions for refreshing a dynamic web clipping, and FIG. 3C depicts illustrative interactions for sharing a dynamic web clipping between client devices 102.

The interactions of FIG. 3A being at (1), where a client device 102A retrieves a web document from a web server 106A. For example, an end user may use a web browser 103 to navigate to a URL corresponding to the document. Thereafter, at (2), the client device 102A renders the document via the browser 103 for display to an end user. Techniques for retrieving and rendering a web document are known in the art and therefore not discussed in detail herein.

Thereafter, at (3), the client device 102 obtains a request to create a clipping of the web document. For example, an end user may select the input 24 of FIG. 1B, and designate a portion via the operations discussed above with reference to FIG. 1C. In response, the device 102A generates metadata for the clipping, including, e.g., an identifier of the web document (e.g., a URL), a designation of the relevant portion of the web document (e.g., coordinates of the selected area) and state information for the web browser that is used to replicate a browsing session of the device 102 within a browser 122 of the service 110. The state information can include a number of different types of information gathered via the browser 103, including but not limited to the viewing parameters of the browser (e.g., height and width), cookies, browser local storage, browser session storage, data objects of the browser 103, user interactions with the browser 103 when rendering the web document, and programmatic functionalities of the browser (such as add-ins or plug-ins) that may modify how the web document is rendered within the browser 122. This metadata is then transmitted to the service 110 at interaction (5). In some instances, a user may submit additional metadata related to a clipping, such as a name or description of the clipping and a desired refresh rate of the clipping.

On receiving the metadata, the coordinator 120 stores the metadata in the clipping metadata store 130. As discussed in more detail below, this information may then be used to create images of the web document that reflect states of the document over time, without requiring the web browser 103 continue to access and update the document. Collectively with the metadata, these images for the clipping represent the dynamic web clipping, enabling an end user to track changes to the document, share the clipping with others, etc.

Illustrative interactions for creating images corresponding to a dynamic web clipping are shown in FIG. 3B. The interactions begin at (1), where the coordinator 120 detects that a refresh of the web clipping is requested. In some instances, the refresh may be requested automatically, such as at a set cadence (e.g., every 10 minutes, 20 minutes, 30 minutes, etc.). In other instances, the request may be requested manually. For example, a client device 102 associated with a clipping may request that the clipping be refreshed. In some embodiments, a user may establish triggers for refreshing of a web clipping, with each such trigger having a set of trigger conditions that, when satisfied, trigger a refresh. Trigger criteria may relate to any data accessible at the coordinator 120, such as passage of time, presence of data at a network-accessible location, etc.

At (2), the coordinator 120 retrieves the clipping metadata from the metadata store 130. The coordinator 120 then, at (3), uses the metadata to recreate the browsing session on a headless browser 122. Illustratively, the coordinator 120 may load the browser 122 with cookies, browser local storage, and browser session storage for the clipping, such that (from the point of view of a web server 106), the browser 122 appears similar or identical to the browser 103 of the client device 102 from which the clipping was created.

At (4), the coordinator 120 then retrieves the web document from the server 106A providing the document, such as by requesting the document from the URL associated with the dynamic web clipping. At (5), the coordinator 120 renders the document in the browser 122 and generates an updated image for the clipping. As noted above, because the browser 122 replicates state of a browser 103 on a client device 102 that created the web clipping, the document as rendered in the browser 122 can be expected to replicate what would be rendered on the browser 103 of the client device 102 at a present point in time. Where the document contains dynamic content, that content can thus be expected to be rendered on the browser 122. The coordinator 120 can therefore capture an image of the relevant portion of the rendered document in order to capture a state of the document at that time. The image can then be stored within the clipping images store 132. While not shown in FIG. 3B, the coordinator 120 can additionally update the metadata for the clipping within the metadata store 130 to indicate that a new image has been associated with the clipping.

In addition, at (7), the service 110 analysis the updated image to detect whether the image satisfies criteria for an alert. For example, the service 110 may compare the image to an immediately preceding image to detect whether the image has changed sufficiently to alert an end user, to detect whether the image contains specific new information associated with an alert condition, or the like. Illustratively, an end user associated with the clipping may specify conditions for alerting based on changes relative to a past image. As another example, the service 110 may compare the image to known images representing undesirable states, such as an image of a generic login page associated with the clipping (e.g., associated with a domain of the clipping or service corresponding to that domain). If the image sufficiently matches alert criteria, the coordinator 120 may alert an end user associated with the clipping. In the instance that the clipping is associated with an undesirable state, the coordinator 120 may prompt the user to provide updated state information, such as by using their web browser 103 to log into a service to correctly render the web document, and providing state information of the browser 103 to the coordinator (e.g., in a manner similar to as described above with respect to FIG. 3A).

Accordingly, via the interactions of FIG. 3B, images for a dynamic web clipping can be generated, refreshing the clipping and enabling the clipping to capture changes to a dynamic web document over time in a manner not possible with static clippings.

With reference to FIG. 3C, illustrative interactions are shown for sharing a dynamic web clipping, enabling one end user to allow another end user to securely access a state of a dynamic web document as of a most recent refresh to the clipping. The interactions of FIG. 3C being at (1), where a client device sends a request to the service 110 to share a dynamic clipping. The request may illustratively include credentials of an end user, which the service 110 may validate to ensure that the end user has permissions to access and share the clipping.

At (2), the coordinator 120 of the service 110 returns a link to the dynamic clipping. Illustratively, the link may represent a URL of the service 110, such that a requesting user accessing the URL is shown information corresponding to the dynamic clipping. In some instances, the URL may be randomly generated, to ensure only those with access the URL are able to access the information of the clipping. Further, the URL may be access protected, such that a requesting user must provide authentication information (e.g., a password) prior to accessing information of the clipping.

At (3), the client device 102A shares the link with a second client device 102B, which in turn requests the dynamic clipping from the service 110 by accessing the URL of the link. While sharing in FIG. 3C is depicted as between client devices 102A and B, a link may be otherwise provided to the client device 102B. For example, in some embodiments the coordinator 120 may transmit the link to the client device 102B.

In response to the request, the coordinator 120 provides to the client device 102B information representing the dynamic clipping. In one embodiment, the information may be a latest image for the clipping—that is, a latest image of a relevant portion of the web document that the clipping represents. For example, the coordinator 120 may retrieve a latest image from the images data store 132 and transmit the image to the client device 102B, or it may present a web document to the client device 102B containing the image.

In some instances, the coordinator 120 may provide to the client device 102B an interface that provides additional information regarding the clipping. For example, the coordinator 120 may provide all images for the clipping to the client device 102B. In some instances, these images may be arranged to facilitate review of changes to the clipping over time. For example, a timeline of images may be presented, enabling a user to compare sequential images over time to view changes between each pair of sequential images. As another example, images may be combined into an animation representing changes to the clipping over time, potentially with controls enabling traversal through the animation (e.g., as a "scrub bar" to navigate to particular points in the animation, each representing a state of a web document at a given point in time).

In some instances, and interface provided to the client device 102B may include a "refresh" input, enabling the device 102B to request a refresh of the dynamic clipping, as discussed for example in FIG. 3B, above. Use of such a refresh input may enable client device 102B to be effectively provided with "read only" access to a web document associated with client device 102A, enabling the device 102B to display the relevant portion of the document without enabling the device to interact with the document.

In still more embodiments, the interface may additionally or alternatively to images provide the client device 102B with actual access to the web document corresponding to the clipping. For example, the interface may include an inline frame ("iframe") or similar element that provides access to a headless browser 122 replicating a user's session on the web document, effectively enabling an end user of the client device 102A to grant full access to a web document at the client device 102B without sharing credentials for the web document.

In some instances, the interface provided by the coordinator 120 may enable the client device 102B to edit the web clipping, such as by annotating an image of the web clipping with highlights, comments, markups, voice memos, or the like. These markups may illustratively be transmitted to the coordinator 120 and stored as a new image or new data associated with the clipping.

While the interactions of FIG. 3C are discussed with respect to sharing web clippings, the same or similar interfaces of the coordinator 120 discussed above may be presented to the client device 102A (e.g., of the end user who created the clipping). For example, an end user who created a clipping may access an interface of the coordinator 120 to view all images of the clipping, compare those images, annotate the images, etc. Moreover, while various examples of interfaces for interacting with a web clipping are discussed, other interfaces are possible. For example, the service 110 may provide interfaces enabling an end user to insert a clipping into a presentation or slide deck hosted on the coordinator 120, with the content of the presentation or slide deck being periodically or continually updated by the coordinator 120 to contain a latest image corresponding to the clipping. The specific interfaces provided may illustratively be based on permissions established by a creator of a web clipping. For example, the creator may be provided with a full set of interfaces, while other users may be provided with interfaces whose functionality is limited to actions permitted by the creator.

Accordingly, via the interactions of FIG. 3C, end users are enabled to interact with dynamic web clippings to view a most recent state of dynamic web content, to share dynamic web clippings with other users, and to enable those other users to interact with the web clippings in permitted manners.

Figure 4:
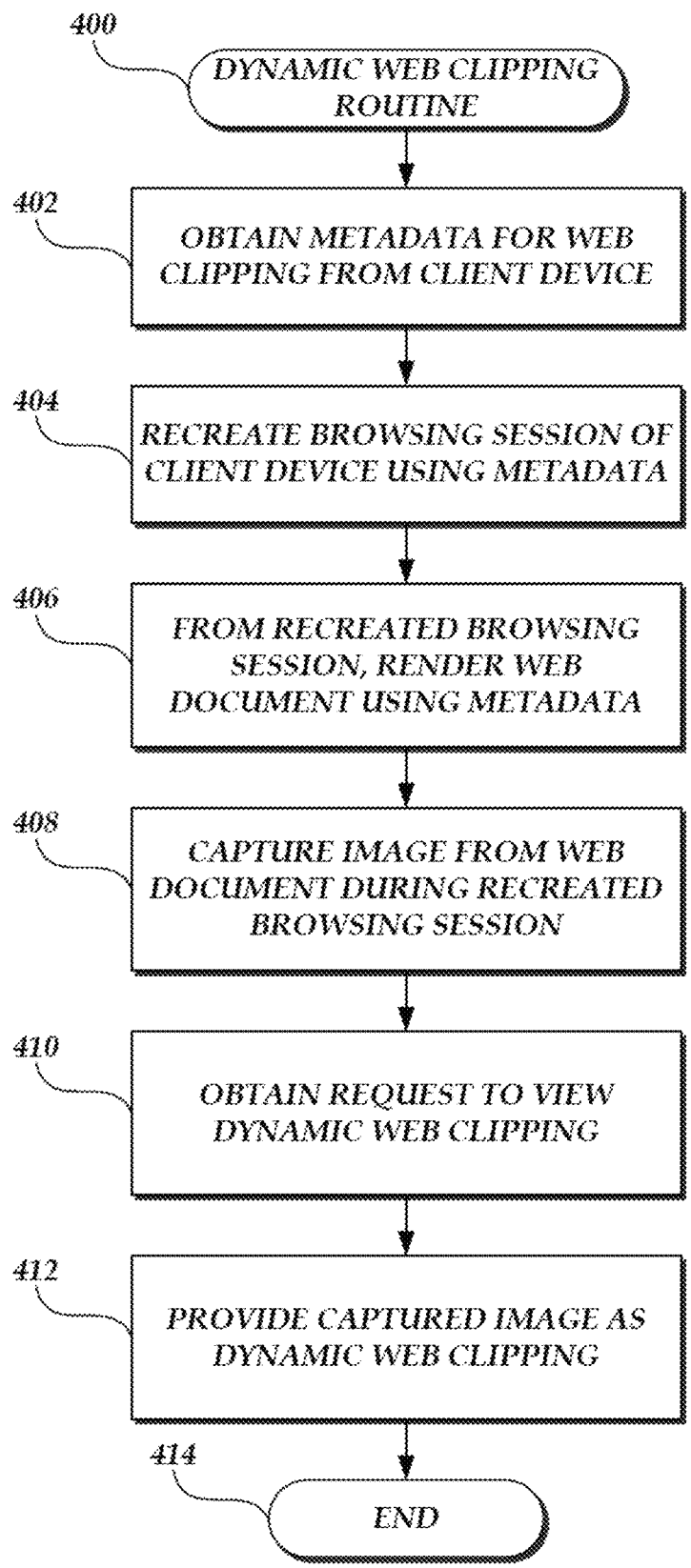
FIG. 4 depicts an illustrative routine for providing dynamic web clippings.

FIG. 4 depicts an illustrative routine 400 for providing dynamic web clippings. The routine 400 may be implement, for example, via the web clipping service 110 of FIG. 2.

The routine 400 begins at block 402, where the web clipping service 110 obtains metadata for a web clipping from a client device. The metadata may include, for example, an identifier of a web document (e.g., a URL) from which the clipping was created, a designation of the relevant portion of the web document (e.g., coordinates of the selected area), and state information for a web browser that is used to replicate a browsing session of a client device that has created the clipping. The state information may include, for example, information gathered from a browser of the client device during creation of the clipping, such as viewing parameters of the browser (e.g., height and width), cookies, browser local storage, browser session storage, and data objects associated with the web document (e.g., JavaScript Object Notation (JSON) objects, a database accessible via the IndexedDatabase API, etc.). The metadata may further include configuration information for the web browser, such as an identifier of the web browser, a version of the web browser, a render engine used by the web browser, or the like. In some embodiments, the metadata may indicate user actions to be taken on the web document prior to generating an image. For example, the user actions may include requested mouse movements, mouse clicks (e.g., at particular locations), scrolling actions, keyboard inputs, touch inputs, etc., which the user has input into the web document prior to requesting creation of a clipping. Illustratively, the user actions may place the web document into a proper state for obtaining images of the document representing the clipping. Still further, in some embodiments the metadata may include information regarding a programmatic functionality the web browser, such as add-ins or plug-ins loaded on the web browser. Such programmatic functionality may modify how the web browser renders the web document. For example, "ad-blocker" plug-ins may prevent certain content from being rendered, altering how the web browser is rendered on the client device. Accordingly, metadata designating this programmatic functionality may be provided to the web clipping service 110 such that the web clipping service 110 can recreate the programmatic functionality to render the web document in the same manner as the client device.

As noted above, the metadata may be obtained based on user interaction with the web document, such as by interaction with an extension in a web browser requesting creation of a dynamic web clipping. In other instances, metadata may be obtained based on programmatic operation of a client device 102. For example, code executing on a client device may programmatically request creation of dynamic web clippings for multiple web documents, and initiate an instance of the routine 400 for each such document.

As block 404, the web clipping service 110 recreates a browsing session of the client device using the metadata. For example, the service 110 may launch a browser (e.g., a headless browser), load state information of the client device into the browser, and direct the browser to the identifier of the web document corresponding to the clipping. In some embodiments, the service 110 may launch a browser with a configuration matching that of the web browser of the client device, as indicated, e.g., in the metadata for the clipping.

At block 406, the web clipping service 110 renders the web document corresponding to the clipping within the recreated browsing session. For example, the service 110 may retrieve HTML from a URL corresponding to the clipping and parse the HTML to render the web document. Because the state of the client's browser has been recreated, the browser of the web service 110 may appear, from the point of view of a server for the web document, to represent the client. Thus, content of the client may be rendered within the browser of the web clipping service 110. Moreover, when the web document contains dynamic content, that dynamic content can be included within the rendering (even if that dynamic content differs, for example, from the content shown to the client device when the client device rendered the web document). Prior to or during rendering, the service 110 may further recreate user interactions indicated within the metadata, recreate programmatic functionality indicated within the metadata, etc., in order to recreate how the browser of the client device would render the web document.

At block 408, the web clipping service 110 captures an image from the web document as rendered during the recreated browsing session. For example, the web clipping service 110 may determine a portion of the document corresponding to the dynamic web clipping (e.g., as designated within metadata of the clipping) and capture an image of that portion. Accordingly, a state of portion of the web document may be represented within the image. The web clipping service 110 can additionally update the metadata for the clipping to indicate that a new image has been associated with the clipping.

At block 410, the web clipping service 110 obtains a request to view the dynamic web clipping. For example, the web clipping service 110 may obtain a request to access a URL associated with the web clipping (which URL may be returned, for example, in response to obtaining the metadata for the clipping form the client device). In some instances, the request may be generated by a user entering the URL within a web browser. In other instances, the request may be generated programmatically by software executing on the client device, such as via an application (e.g., a slide deck application).

At block 412, the web clipping service 110 provides, in response to the request, the image of the web document captured at block 408. Accordingly, an end user viewing the web clipping may view a most recent state of the web document as captured at the web clipping service 110. The routine 400 then ends at block 414.

One skilled in the art will appreciate that the routine 400 may be modified in various ways. For example, blocks 404 through 412 may be repeated, manually or periodically, in order to refresh the latest image of a dynamic web clipping. Block 402 may additionally or alternatively be repeatedly, manually or periodically, in order to update metadata for the dynamic web clipping. For example, where authentication of a client device to a web document is associated with a time out value, the client may refresh the authentication information (e.g., by reauthenticating with a server providing the web document) and provide updated authentication information as updated metadata for the web clipping, such that the web clipping can continue to be updated at the web clipping service 110.

Figure 5:
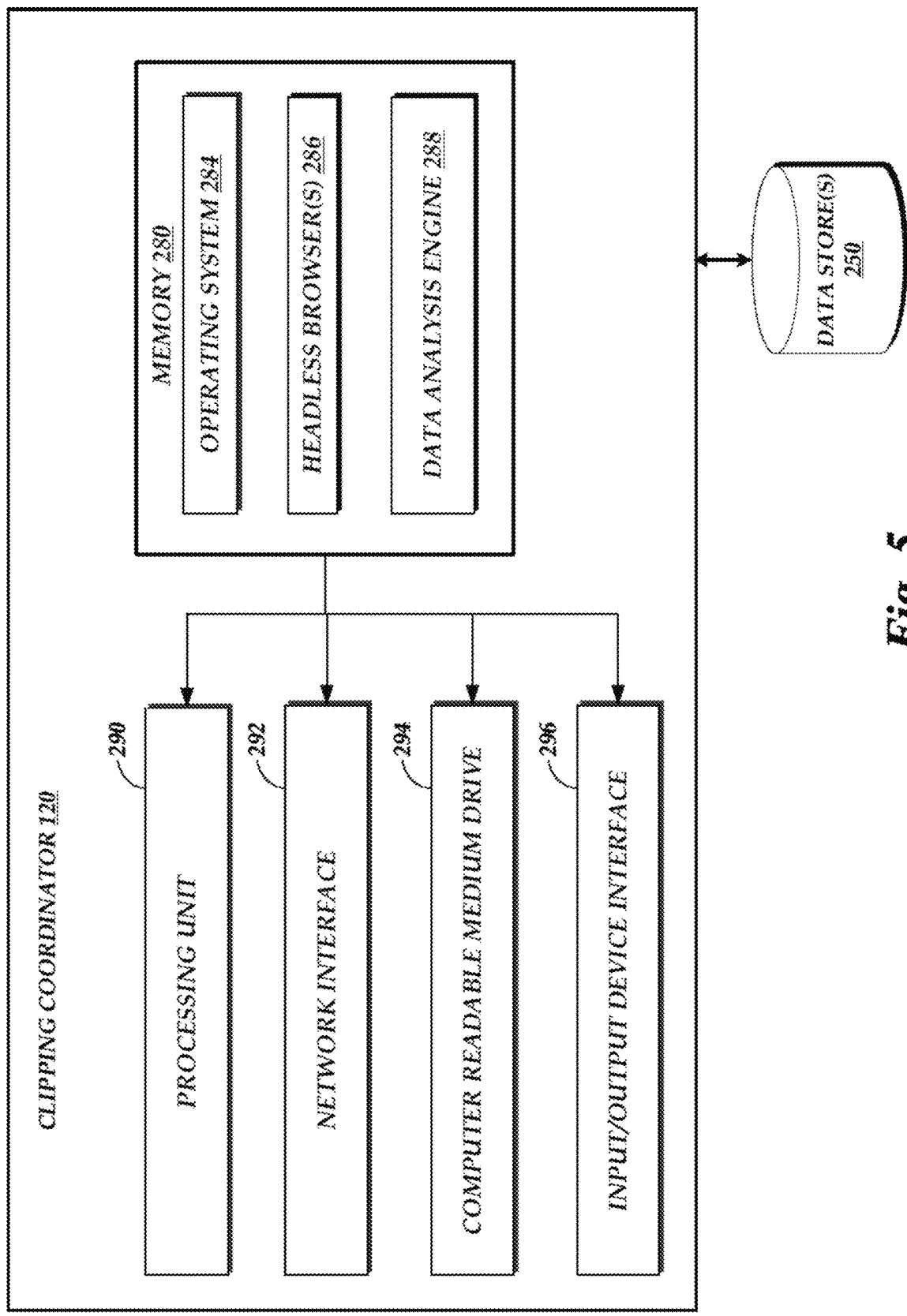
FIG. 5 depicts a general architecture of a computing system implementing a clipping coordinator of the web clipping service of FIG. 2.

FIG. 5 depicts a general architecture of a computing system implementing the clipping coordinator 120 of FIG. 2. The general architecture of the system depicted in FIG. 5 includes an arrangement of computer hardware and software that may be used to implement aspects of the present disclosure. The hardware may be implemented on physical electronic devices, as discussed in greater detail above. The system may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in FIG. 5 (e.g., client device 102, web server 106, etc.).

As illustrated, the system includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 5 as a single set of memory 280, memory 280 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 280 may store an operating system 284 that provides computer program instructions for use by the processing unit 290 in the general administration and operation of the device 200. The memory 280 may further include computer program instructions and other information for implementing aspects of the present disclosure. For example, in one embodiment, the memory 280 includes headless browsers 286 and a data analysis engine 288, each representing code executable to implement the respective headless browsers 122 and data analysis engine 124 of FIG. 2. In combination, the elements of the memory 280, when executed on the device 200, enable implementation of embodiments of the present disclosure.

The system of FIG. 5 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 5 as a clipping coordinator 120, similar components may be utilized in some embodiments to implement other devices shown in the environment 100 of FIG. 2.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of generating dynamic web clippings, the method implemented at a web clipping service associated with a client computing device, the method comprising:
    obtaining, from the client computing device, metadata for a dynamic web clipping of a web document hosted on a host computing device distinct from the web clipping service and the client computing device, wherein the metadata includes an identifier of the web document and state information of a web browser that has rendered the web document on the client computing device at a first time, wherein the state information enables replication of a browsing session of the client computing device;
    using the metadata, recreating the browsing session of the client computing device on the web clipping service to result in a recreated browsing session, wherein recreating the browsing session of the client computing device on the web clipping service to result in a recreated browsing session comprises retrieving, from the host computing device, a current state of the web document at a second time subsequent to the first time;
    rendering, within the recreated browsing session, the current state of the web document as retrieved from the host computing device at the second time subsequent to the first time at which the web browser of the client computing device rendered the web document;
    capturing an image from the current state of the web document, as rendered within the recreated browsing session and retrieved from the host computing device at the second time subsequent to the first time at which the web browser of the client computing device rendered the web document;
    obtaining a request to view the dynamic web clipping of the web document; and
    in response to the request to view the dynamic web clipping of the web document, providing the image from the current state of the web document, as rendered within the recreated browsing session and retrieved from the host computing device at the second time subsequent to the first time at which the web browser of the client computing device rendered the web document, as the dynamic web clipping of the web document.

2. The method of claim 1, wherein the metadata further includes a designation of a portion of the web document represented in the dynamic web clipping.

3. The method of claim 1, wherein the state information includes one or more of display parameters of the web browser on the client computing device, browser local storage of the web browser, browser session storage of the web browser, cookies of the web browser, or data objects of the web browser.

4. The method of claim 1, wherein the metadata further includes configuration information for the web browser, information designating programmatic functionality of the web browser, or user interactions implemented on the web browser.

5. The method of claim 4, wherein recreating the browsing session of the client computing device on the web clipping service comprises launching a web browser on the web clipping service with a configuration matching the configuration information.

6. The method of claim 5, wherein the web browser on the web clipping service is a headless browser.

7. The method of claim 1 further comprising providing to the client computing device a network location at which the dynamic web clipping is accessible.

8. The method of claim 1 further comprising:
    detecting a trigger to refresh the dynamic web clipping;
    capturing a second image from the web document, as rendered within the recreated browsing session; and
    storing the second image in association with the dynamic web clipping.

9. The method of claim 8 further comprising, wherein the trigger to refresh the dynamic web clipping is at least one of a manually activated trigger or a time activated trigger.

10. The method of claim 1 further comprising storing the image within a historical collection of images associated with the dynamic web clipping.

11. The method of claim 1 further comprising adding to the image overlay information comprising at least one of a title of the dynamic web clipping, a last refresh time of the dynamic web clipping, a periodicity of refreshing the dynamic web clipping, or an identifier of the web document.

12. The method of claim 1 further comprising obtaining updated metadata for the dynamic web clipping, the updated metadata including updated authentication information of the client computing device for the web document.

13. A system comprising:
a data store storing computer-executable instructions; and
a processor configured to execute the computer-executable instructions, wherein execution of the computer-executable instructions causes the system to:
obtain metadata for a dynamic web clipping of a web document hosted on a host computing device distinct from the system, wherein the metadata includes an identifier of the web document and state information of a web browser that has rendered the web document at a first time, wherein the state information enables replication of a browsing session;
using the metadata, recreate the browsing session on the system to result in a recreated browsing session, wherein recreating the browsing session on the system to result in a recreated browsing session comprises retrieving, from the host computing device, a current state of the web document at a second time subsequent to the first time;
render, within the recreated browsing session, the current state of the web document as retrieved from the host computing device at the second time subsequent to the first time at which the web browser rendered the web document;
capture an image from the current state of the web document, as rendered within the recreated browsing session and retrieved from the host computing device at the second time subsequent to the first time at which the web browser rendered the web document;
obtain a request to view the dynamic web clipping of the web document; and
in response to the request to view the dynamic web clipping of the web document, provide the image from the current state of the web document, as rendered within the recreated browsing session and retrieved from the host computing device at the second time subsequent to the first time at which the web browser rendered the web document, as the dynamic web clipping of the web document.

14. The system of claim 13, wherein execution of the computer-executable instructions further causes the system to:
analyze the image to detect that the image satisfies criteria for notifying a client computing device;
send a notification to the client computing device that the image satisfies the criteria.

15. The system of claim 14, wherein detecting that the image satisfies the criteria comprises detecting that the image is a login page, and wherein the notification to the client computing device that the image satisfies the criteria includes a request to update authentication information associated with the dynamic web clipping.

16. The system of claim 14, wherein the criteria are based on a detected content of the image.

17. The system of claim 13, wherein the metadata includes user actions to be implemented in the recreated browsing session.

18. The system of claim 13, wherein execution of the computer-executable instructions further causes the system to provide to a client computing device an interface enabling interaction with the web document as rendered within the recreated browsing session.

19. One or more non-transitory computer-readable media comprising computer-executable instructions that, when executed by a computing system, causes the computing system to:
obtain metadata for a dynamic web clipping of a web document hosted on a host computing device distinct from the computing system, wherein the metadata includes an identifier of the web document and state information of a web browser that has rendered the web document at a first time, wherein the state information enables replication of a browsing session;
using the metadata, recreate the browsing session on the system to result in a recreated browsing session, wherein recreating the browsing session on the computing system to result in a recreated browsing session comprises retrieving, from the host computing device, a current state of the web document at a second time subsequent to the first time;
render, within the recreated browsing session, the current state of the web document as retrieved from the host computing device at the second time subsequent to the first time at which the web browser rendered the web document;
capture an image from the current state of the web document, as rendered within the recreated browsing session and retrieved from the host computing device at the second time subsequent to the first time at which the web browser rendered the web document;
obtain a request to view the dynamic web clipping of the web document; and
in response to the request to view the dynamic web clipping of the web document, provide the image from the current state of the web document, as rendered within the recreated browsing session and retrieved from the host computing device at the second time subsequent to the first time at which the web browser rendered the web document, as the dynamic web clipping of the web document.

20. The one or more non-transitory computer-readable media of claim 19, wherein the request to view the dynamic web clipping of the web document is obtained from a software application executing on a client computing device, the software application incorporating the image from the web document into data presented to an end user.

* * * * *